(12) United States Patent
Seo (10) Patent No.: US 7,865,074 B2
(45) Date of Patent: Jan. 4, 2011

(54) HEAT RECOVERING VENTILATION APPARATUS OF ROTARY

(75) Inventor: Hyoung Deog Seo, Goyang-Si (KR)

(73) Assignees: TMT Engineering Co., Ltd., Seoul (KR); Kyung Woo Systech Inc., Seoul (KR)

( * ) Notice: Subject to any disclaimer, the term of this patent is extended or adjusted under 35 U.S.C. 154(b) by 1071 days.

(21) Appl. No.: 11/569,664

(22) PCT Filed: Jul. 13, 2005

(86) PCT No.: PCT/KR2005/002255

§ 371 (c)(1),
(2), (4) Date: Nov. 27, 2006

(87) PCT Pub. No.: WO2006/006827

PCT Pub. Date: Jan. 19, 2006

(65) Prior Publication Data

US 2007/0218831 A1    Sep. 20, 2007

(30) Foreign Application Priority Data

Jul. 13, 2004    (KR) ...................... 10-2004-0054370

(51) Int. Cl.
*B60H 1/02* (2006.01)
*F24H 1/10* (2006.01)

(52) U.S. Cl. ...................... 392/485; 454/161
(58) Field of Classification Search ................. 392/485, 392/486–494, 320–321; 454/161, 148–160
See application file for complete search history.

(56) References Cited

U.S. PATENT DOCUMENTS

| | | | | |
|---|---|---|---|---|
| 3,067,316 A | * | 12/1962 | Hill ............................ | 392/350 |
| 3,247,524 A | * | 4/1966 | Umann ........................ | 4/420.2 |
| 4,310,747 A | * | 1/1982 | Rice et al. ................... | 392/466 |
| 5,963,709 A | * | 10/1999 | Staples et al. ............... | 392/488 |
| 6,327,427 B1 | * | 12/2001 | Burkett ....................... | 392/369 |

FOREIGN PATENT DOCUMENTS

| | | |
|---|---|---|
| JP | 56-95327 | 7/1981 |
| JP | 60-033421 | 2/1985 |
| JP | 63-164926 | 10/1988 |
| JP | 10-054689 | 2/1998 |

* cited by examiner

*Primary Examiner*—Daniel Robinson
(74) *Attorney, Agent, or Firm*—IPLA P.A.; James E. Bame (57) ABSTRACT

Disclosed herein is a rotary-type heat recovery ventilation apparatus, which is constructed to perform heat exchange between inlet air and exhaust air. The apparatus includes a main body having an intake duct and a discharge duct therein, a plurality of electric heating plates passing through a space in the intake duct and the discharge duct of the main body to transfer heat, and rotating about a main shaft, with a plurality of pores being formed on each of the electric heating plates, a pair of blowing fans mounted to a surface of the intake duct and a surface of the discharge duct, thus blowing and exhausting air, and a motor to rotate the main shaft. The ventilation apparatus transfers heat, recovered from air exhausted from a room during ventilation, to inlet air, and filters various impurities from the passing air, thus circulating fresh air without the energy loss.

8 Claims, 9 Drawing Sheets

HEAT RECOVERING VENTILATION APPARATUS OF ROTARY

TECHNICAL FIELD

The present invention relates, in general, to a ventilation apparatus, intended to circulate inside air and outside air and, more particularly, to a rotary-type heat recovery ventilation apparatus, which transfers heat, recovered from air exhausted from a room during ventilation, to inlet air, thus allowing the circulation of fresh air without loss of energy during a heating or cooling operation.

A general ventilation apparatus is constructed so that a blowing fan is installed in a duct to discharge indoor air to the outside and introduce outdoor air into a room. However, air heated or cooled in the room is discharged to the outside without any treatment, so that the loss of energy is increased, thereby thermal efficiency is low.

BACKGROUND ART

In order to solve the problem, various types of heat recovery ventilation apparatuses have been proposed. The ventilation apparatuses are typically classified into rotary-type ventilation apparatuses, heat pipe-type ventilation apparatuses, and plate-type ventilation apparatuses. The heat pipe-type ventilation apparatuses use a refrigerant, such as Freon, so that they are suitable for large-scale facilities, such as buildings. However, the heat pipe-type ventilation apparatuses are disadvantageous in that a heavy burden of expense for installation and maintenance is incurred. The plate-type ventilation apparatuses are suitable for air conditioners. However, the plate-type ventilation apparatuses are disadvantageous in that it is very inconvenient to clean a large number of cooling fins provided in the ventilation apparatuses and maintain the performance of the ventilation apparatuses. The rotary-type ventilation apparatuses are relatively small in processing capacity thereof but are simple in structure. Thus, the rotary-type ventilation apparatuses are suitable for small-scale facilities, for example, homes, offices, barns, greenhouses, mushroom culture boxes, and earthworm cages.

However, there has been increased demand for novel heat recovery ventilation apparatuses, which have heating, cooling, and dehumidifying functions according to seasons, and which filter external dangerous materials, thus maintaining clean indoor air, in addition to recovering waste heat regardless of whether they are used residentially or industrially.

DISCLOSURE

Technical problem

Accordingly, the present invention has been made keeping in mind the above problems occurring in the prior art, and an object of the present invention is to provide a rotary-type heat recovery ventilation apparatus, which transfers heat, recovered from air exhausted from a room during ventilation, to inlet air, and filters various impurities from the passing air, thus circulating fresh air during heating or cooling operation without the energy loss.

Technical solution

In order to accomplish the object, the present invention provides a rotary-type heat recovery ventilation apparatus, constructed to perform heat exchange between inlet air and exhaust air, the apparatus including a main body having an intake duct and a discharge duct therein; a plurality of electric heating plates passing through a space in the intake duct and the discharge duct of the main body to transfer heat, and rotating about a main shaft, with a plurality of pores being formed on each of the electric heating plates; a pair of blowing fans mounted to a surface of the intake duct and a surface of the discharge duct, thus blowing and exhausting air; and a motor to rotate the main shaft. The ventilation apparatus transfers heat, recovered from air exhausted from a room during ventilation, to inlet air, and filters various impurities from the passing air, thus circulating fresh air during heating or cooling operation without the energy loss.

Advantageous effects

As described above, the present invention transfers heat, recovered from air exhausted from a room during ventilation, to inlet air, and filters various impurities from the passing air, thus circulating fresh air during heating or cooling operation without the energy loss.

The rotary-type heat recovery ventilation apparatus is disclosed for illustrative purposes. It is understood by those skilled in the art that the foregoing description is a preferred embodiment of this invention and that various changes and modifications may be made to the invention without departing from the spirit and scope of the invention as disclosed in the accompanying claims.

DESCRIPTION OF REFERENCE CHARACTERS OF IMPORTANT PARTS

| 10, 100: | main body | 11, 110: | intake duct |
|---|---|---|---|
| 12, 120: | discharge duct | 13, 113: | blowing fan |
| 15: | motor | 20: | partition plate |

| | | | |
|---|---|---|---|
| 25: | sealing member | 30, 130: | electric heating plate |
| 35, 135: | main shaft | 150: | separation unit |
| 160: | ring frame | 170: | partition frame |

Best Mode

A rotary-type heat recovery ventilation apparatus is constructed to perform heat exchange between inlet air and exhaust air, and includes a main body having an intake duct and a discharge duct therein; a plurality of electric heating plates passing through a space in the intake duct and the discharge duct of the main body to transfer heat, and rotating about a main shaft, with a plurality of pores being formed on each of the electric heating plates; a pair of blowing fans mounted to a surface of the intake duct and a surface of the discharge duct, thus blowing and exhausting air; and a motor to rotate the main shaft.

According to this invention, the main body has a cylinder shape having a hollow part, the hollow part being divided into two parts by a flat partition plate, thus defining the intake duct and the discharge duct, and a plurality of slits is provided on the partition plate such that the electric heating plates are fitted into the slits.

Further, the main body is divided into upper and lower parts that are coupled to each other via a flange. The ventilation apparatus further includes a sealing member which is provided in each of the slits and prevents the flow of gas while each of the electric heating plates is inserted into the corresponding slit.

According to another aspect of this invention, the main body includes a plurality of separation units coupled to each other, thus providing a cylindrical shape, each of the separation units including a ring frame having bolt holes at regular intervals such that fastening bolts are tightened into the corresponding bolt holes, and a partition frame integrally provided in a diameter direction of the ring frame, with a shaft hole formed in a central portion of the partition frame so that the main shaft passes through the shaft hole.

According to this invention, the separation units are fastened to each other by tightening the fastening bolts into the corresponding bolt holes. The electric heating plates are seated between the separation units, and are rotated by the main shaft which is inserted into the shaft hole.

Further, a protruding step is provided on a surface of an end of the ring frame of each of the separation units, and a recessed step is provided on an opposite surface of the end of the ring frame, so that the separation units are closely coupled to each other by the protruding steps and the recessed steps.

Hereinafter, the preferred embodiments of this invention will be described in detail with reference to the accompanying drawings.

Figure 1:
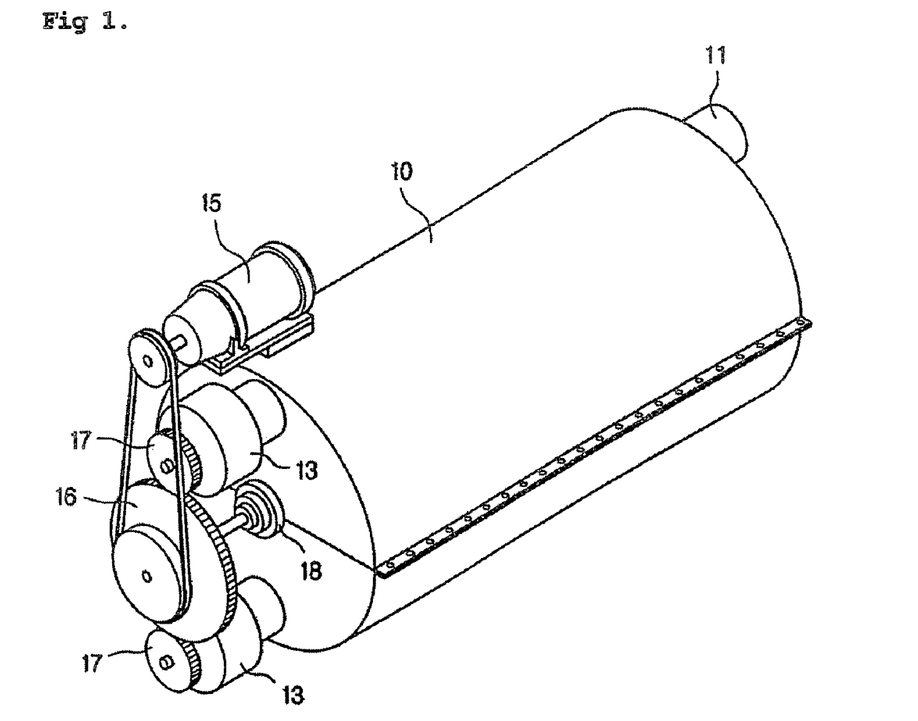
FIG. 1 is a perspective view to schematically show important parts of a rotary-type heat recovery ventilation apparatus, according to the first embodiment of the present invention.
Figure 2:
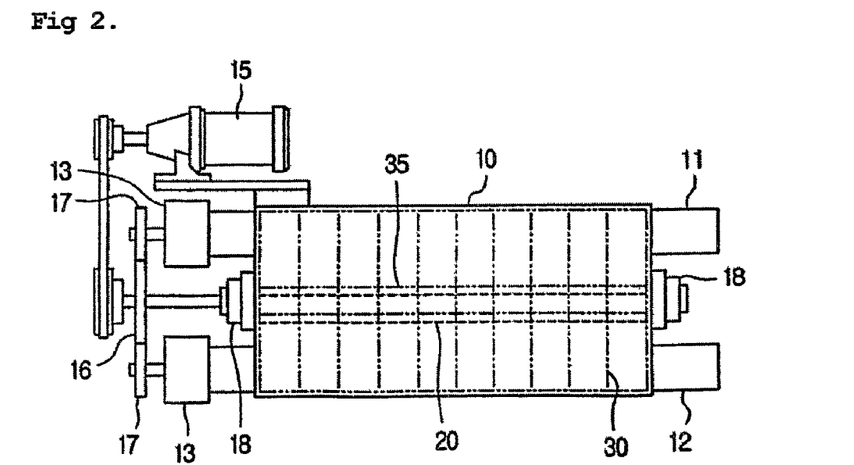
FIG. 2 is a view to show the construction of the apparatus of FIG. 1.

FIG. 1 is a perspective view of a ventilation apparatus, according to the first embodiment of this invention, and FIG. 2 is a schematic view of important parts of the apparatus.

The present invention relates to a ventilation apparatus that performs heat exchange between inlet air and exhaust air. Of various types of ventilation apparatuses including a rotary-type ventilation apparatus, a heat pipe-type ventilation apparatus, and a plate-type ventilation apparatus, the present invention relates to the rotary-type ventilation apparatus which is suitable for homes, offices, barns, greenhouses, mushroom culture boxes, earthworm cages, etc.

According to the present invention, the ventilation apparatus includes a main body 10 having an intake duct 11 and a discharge duct 12. The main body 10 houses a rotary unit that will be described later, so that the main body 10 has a cylindrical shape. Preferably, the main body 10 is made of synthetic resin having good heat insulating capacity or metal whose outer surface is treated to have heat insulating capacity. The intake duct 11 and the discharge duct 12 are parallelly mounted to one surface of the main body 10, and are accommodated in a room.

Figure 3:
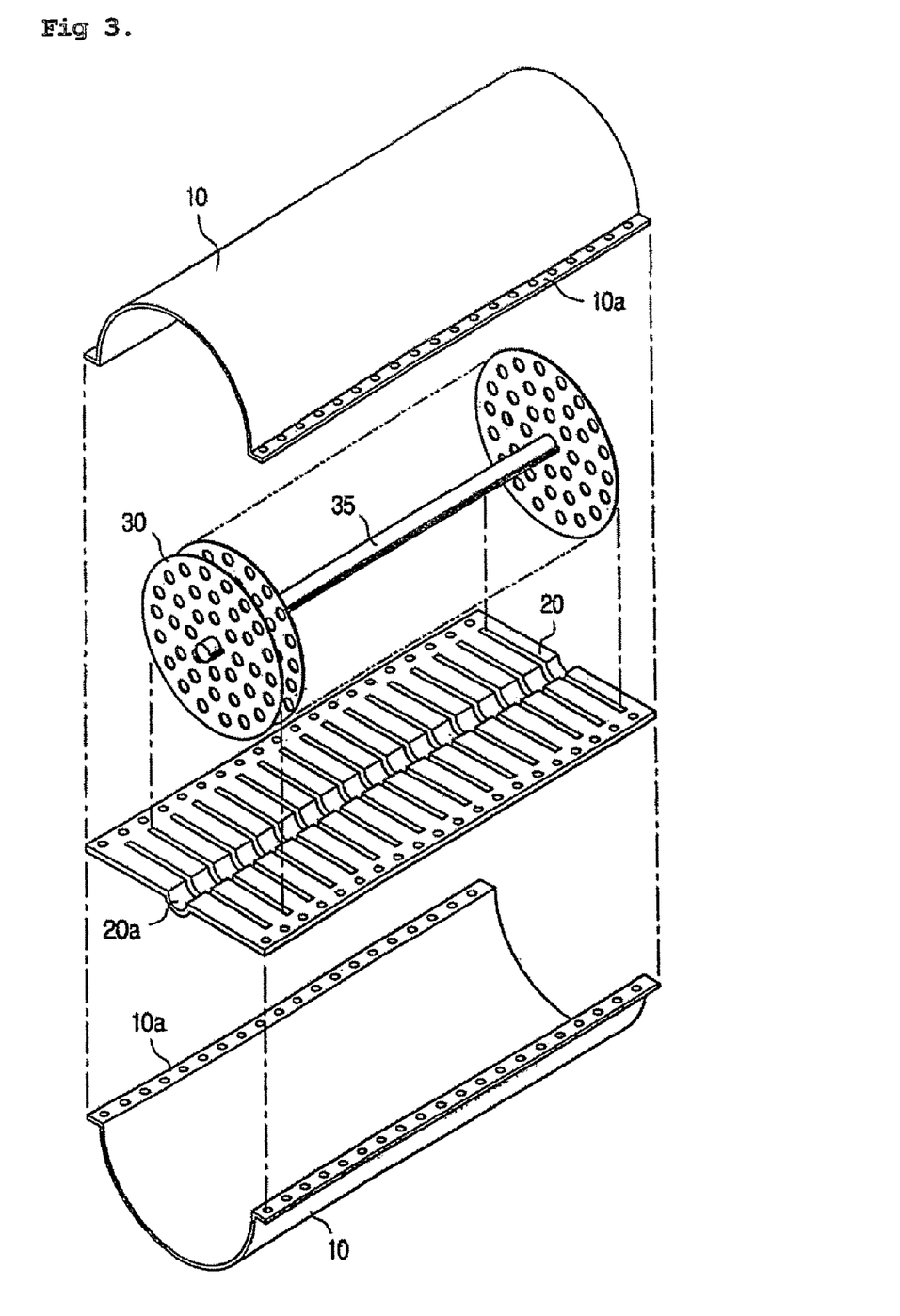
FIG. 3 is an exploded perspective view of a main body of the apparatus shown in FIG. 1.

Referring to FIG. 3, the main body 10 of this invention is divided into two parts which are upper and lower parts and are coupled to each other via flanges 10a. The main body 10 is manufactured through plastic working such that each of the upper and lower parts has a semicircular cross-section. The flanges 10a are provided on both sides of each of the upper and lower parts of the main body 10 in such a way as to be bent relative to the main body 10. The upper and lower parts of the main body 10 are coupled to each other by tightening bolts into the flanges 10a. Although not shown in the drawings, packing may be interposed between coupling surfaces of the upper and lower parts so as to maintain air-tightness.

Further, according to this invention, a partition plate 20 is installed in the main body 10 to divide the interior of the main body 10 into upper and lower parts. The partition plate 20 is positioned at a midsection of the main body 10, and is horizontally installed between the flanges 10a. Thereby, an air inlet space is defined at an upper position of the main body 10, and an air outlet space is defined at a lower position of the main body 10, so that the air inlet and outlet spaces are independently formed. In FIG. 3, a curved part 20a is provided along a central portion of the partition plate 20, thus allowing a main shaft 35, which will be described later in detail, to be rotated without interference of the partition plate 20. As compared to the main body 10, the partition plate 10 requires high heat conductivity rather than high mechanical strength.

Figure 4:
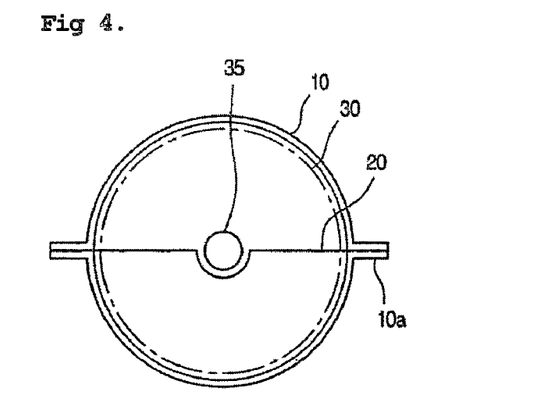
FIG. 4 is a side view of the main body of the apparatus shown in FIG. 1.

Further, according to this invention, porous electric heating plates 30 are rotatably mounted to the main shaft 35 at regular intervals to make upper and lower spaces of the main body 10 communicate with each other. The main shaft 35 is rotatably supported at both ends of the main body 10 by bearings 18. In order to transmit a drive force from a motor 15 to the main shaft 35, the main shaft 35 extends forwards from the main body 10. The electric heating plates 30, mounted to the main shaft 35, must have good heat conductivity, and have precise tolerances (plan view, etc.). Further, the electric heating plates 30 must be mounted to the main body 35 so that they do not shake.

Figure 5:
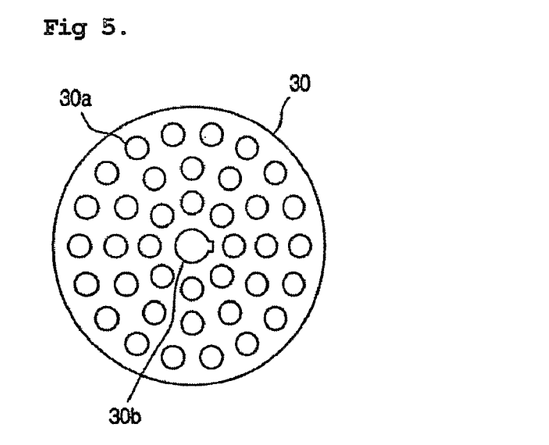
FIG. 5 is a front view of an electric heating plate of the apparatus of FIG. 1.

In FIG. 5, a plurality of pores 30a having the same size is evenly formed throughout each of the electric heating plates 30. Preferably, a path sectional area obtained by summing the areas of the pores 30a, which are formed in each of the electric heating plates 30, is larger than a path sectional area obtained by summing the intake duct 11 and the discharge duct 12. A shaft hole 30b is formed in a central portion of each of the electric heating plates 30, so that the main shaft 35 is secured to the shaft hole 30b using a key. The electric heating plates 30 are made of the same material, but may be made of two or more different materials and be alternately arranged.

According to the present invention, blowing fans 13 are coupled to the main shaft 35 and are driven to circulate air to the intake duct 11 or the discharge duct 12. One blowing fan 13 is installed at a position around the intake duct 11 to correspond to the upper space of the main body 10. The other blowing fan 13 is installed at a position around the discharge duct 12 to correspond to the lower space of the main body 10.

Although not shown in the drawings, each of the blowing fans 13 has an air inlet port and an air outlet port. As shown in FIG. 1, the blowing fans 13 are coupled to the main shaft 35 by arranging gears 16 and 17 in series. Thus, when the blowing fans 13 are driven in opposite directions by rotation of the main shaft 35, air intake and discharge operations are simultaneously executed. The motor 15 and the main shaft 35 may be coupled to each other using a general power transmission means, such as a belt or chain.

Figure 6:
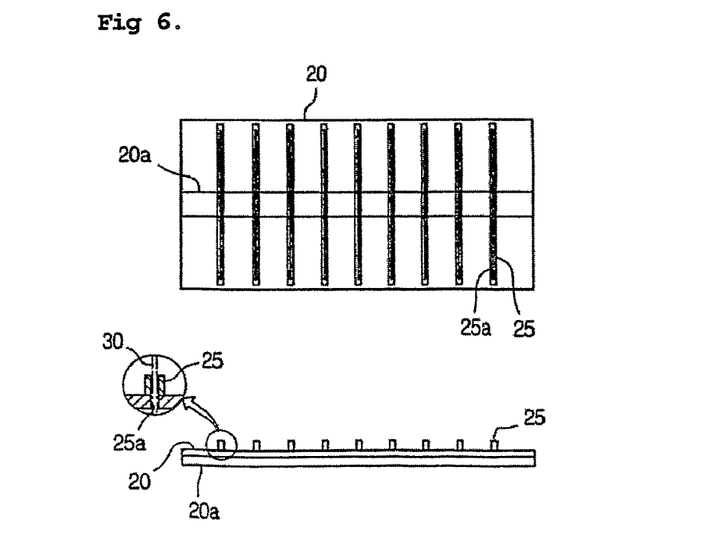
FIG. 6 is a view to show a partition plate of the apparatus of FIG. 1 in a plan view and a front view.
Figure 7:
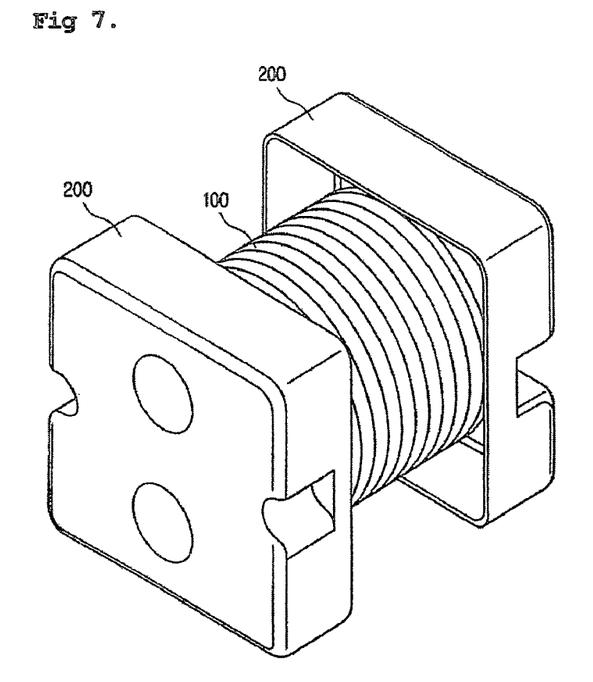
FIG. 7 is a perspective view to schematically show important parts of a rotary-type heat recovery ventilation apparatus, according to the second embodiment of the present invention.
Figure 8:
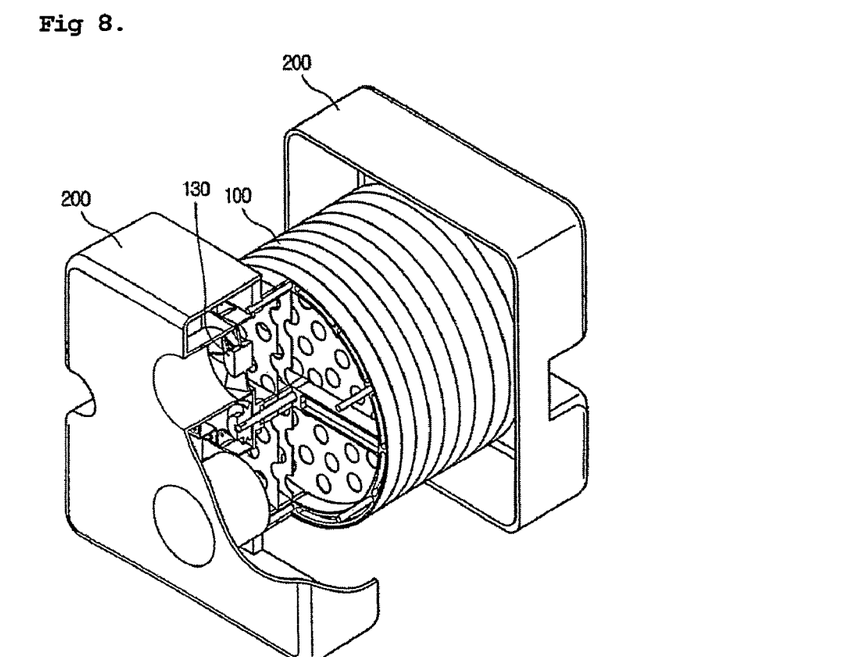
FIG. 8 is a partially cutaway perspective view of the apparatus of FIG. 7.
Figure 9:
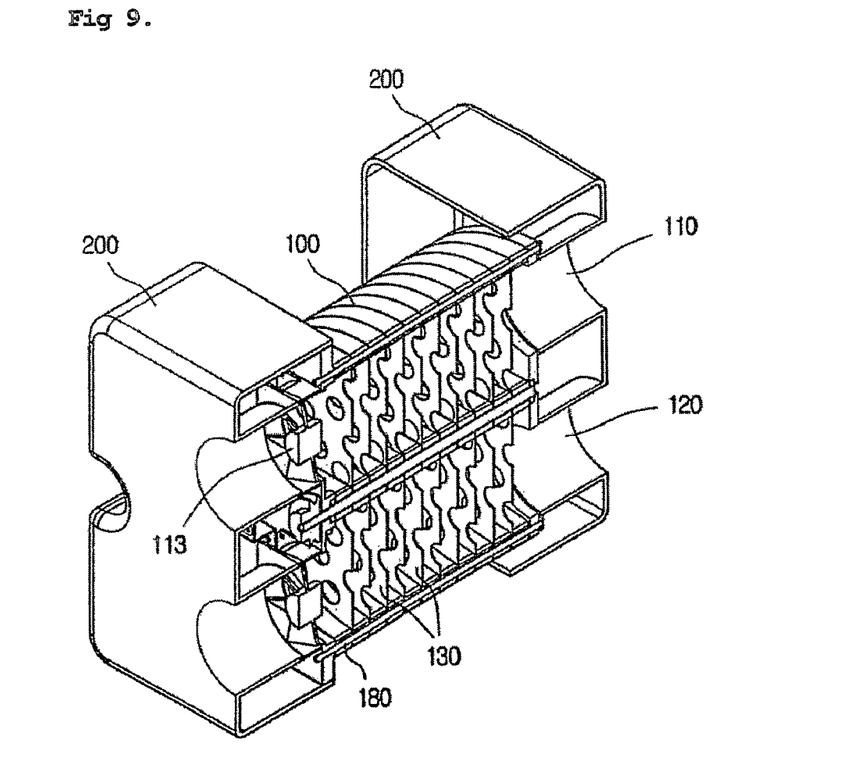
FIG. 9 is a cutaway perspective view of the apparatus of FIG. 7.

FIG. 6 is a view to show the partition plate 20, according to this invention, in a plan view and a front view.

The partition plate 20 of this invention is provided with sealing members 25 each having a slit 25a so that each electric heating plate 30 is rotatably fitted into the partition plate 20. The sealing members 25 provided on the partition plate 20 function to prevent air from leaking between the upper and lower spaces when the electric heating plates 30 are fitted into the partition plate 20 and are rotated. The slits 25a formed in the sealing members 25 have a size which is suitable for maintaining airtightness without constraining the rotation of the electric heating plates 30. The sealing members 25 require abrasion resistance, because the sealing members 25 may be in frictional contact with the electric heating plates 30, to which impurities may be attached.

The operation of the apparatus according to this invention constructed as described above will be described below. As the motor 15 is driven, the main shaft 35 rotates, and simultaneously, the blowing fans 13 are driven through the gears 16 and 17. At this time, air is drawn into the upper space of the main body 10, and air is discharged from the lower space of the main body 10. When the inlet and exhaust air, passing through the electric heating plates 30 that rotate along with the main shaft 35, passes through the pores 30a formed in the electric heating plates 30, heat is transmitted to the electric heating plates 30, and a heat exchange process is continuously performed. At this time, hot air from a hot side is transmitted to cold air. Thereby, an air exchanging operation is performed without the loss of heat.

In this case, impurities laden in the inlet or exhaust air are attached to water films formed on the electric heating plates 30, and are wiped off the sealing members 25 of the partition plate 20 due to rotation of the electric heating plates 30. The sealing members 25 where impurities are stacked up are periodically cleaned so as to get rid of the impurities Even if the impurities drop downwards, the impurities are discharged to the outside but are supplied to a room. Since it is easy to disassemble the main body 10, the maintenance of the apparatus is convenient (see, FIG. 2).

The ventilation apparatus of this invention may be suitable for industrial fields, by increasing the number of electric heating plates 30, and slightly modifying the design of the partition plate 20 such that the ventilation apparatus has a large capacity. Even though the size of the main body 10, the partition plate 20, and the electric heating plates 30 is increased, the construction of the drive unit of the ventilation apparatus is not changed, so that it is easy to install, and maintenance costs are low, thereby it is economically efficient.

Although not shown in the drawings, a drain cock may be installed to discharge water from the main body 10.

The second embodiment of this invention will be described in detail with reference to FIGS. 7 through 14. As shown in the drawings, a ventilation apparatus of the second embodiment is different from the ventilation apparatus of the first embodiment, in terms of the assembly and construction of a main body 100. The ventilation apparatus of the second embodiment is equal to that of the first embodiment in terms of operation.

Figure 11:
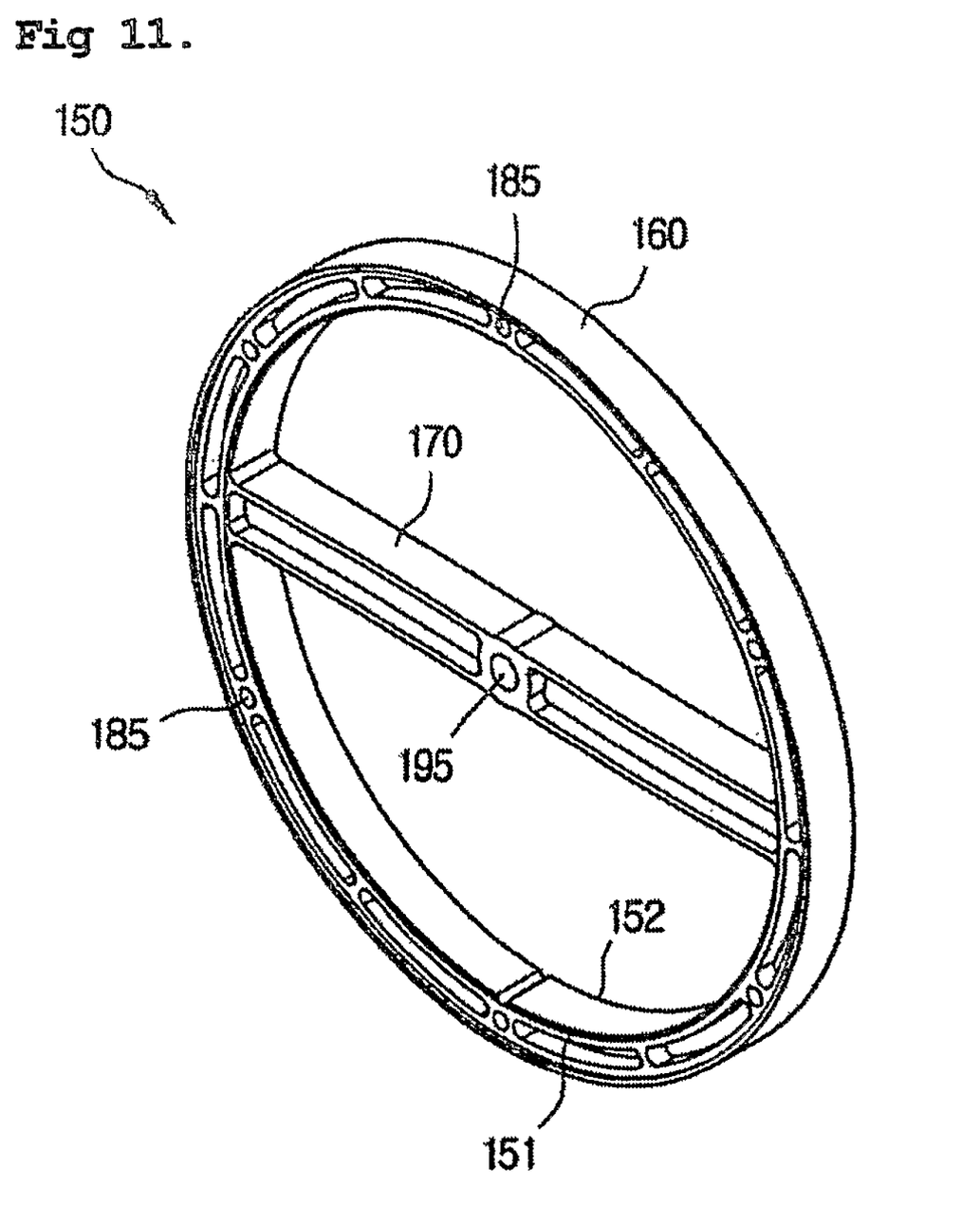
FIGS. 11 and 12 are views illustrating a separation unit.
Figure 12:
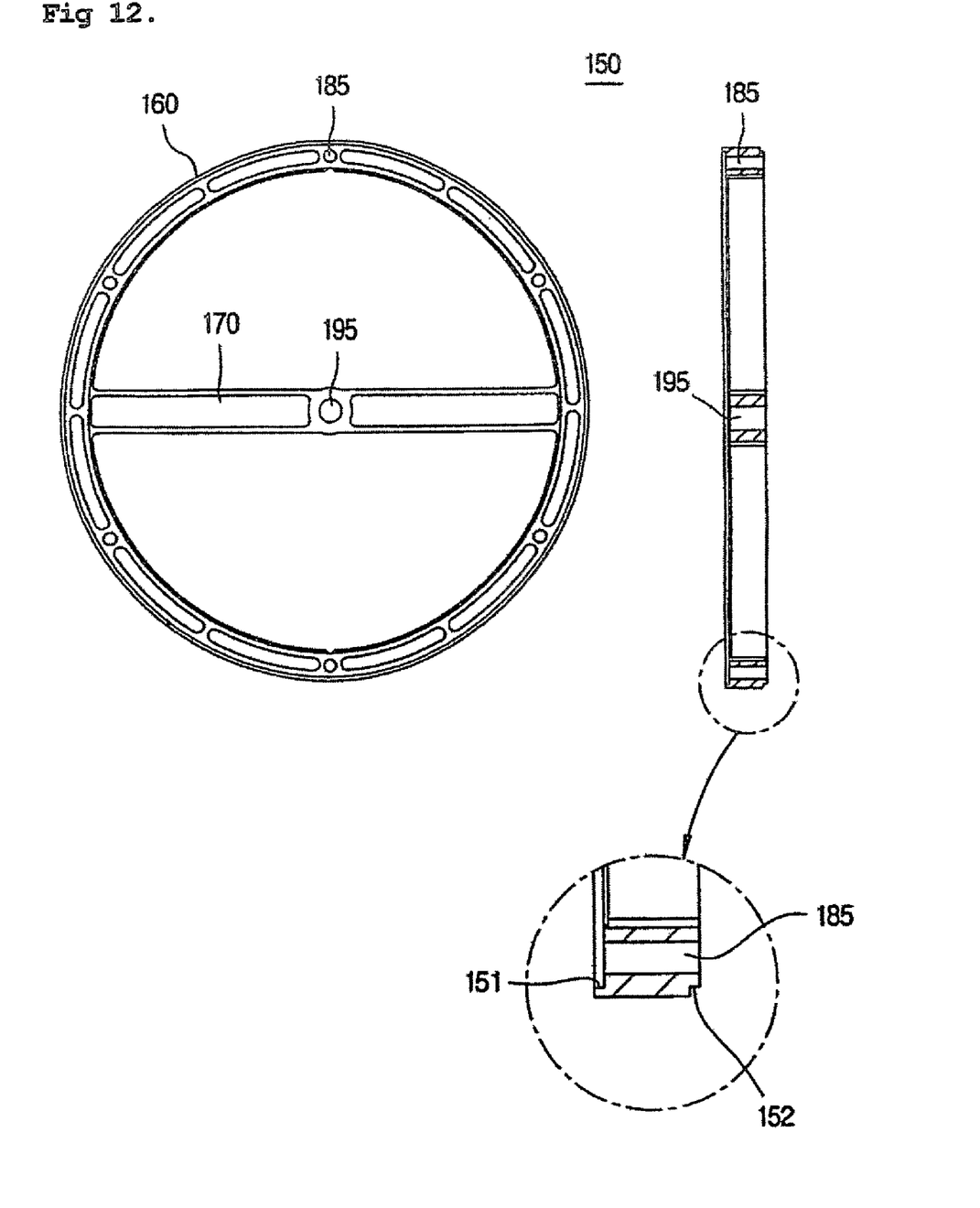
Figure 13:
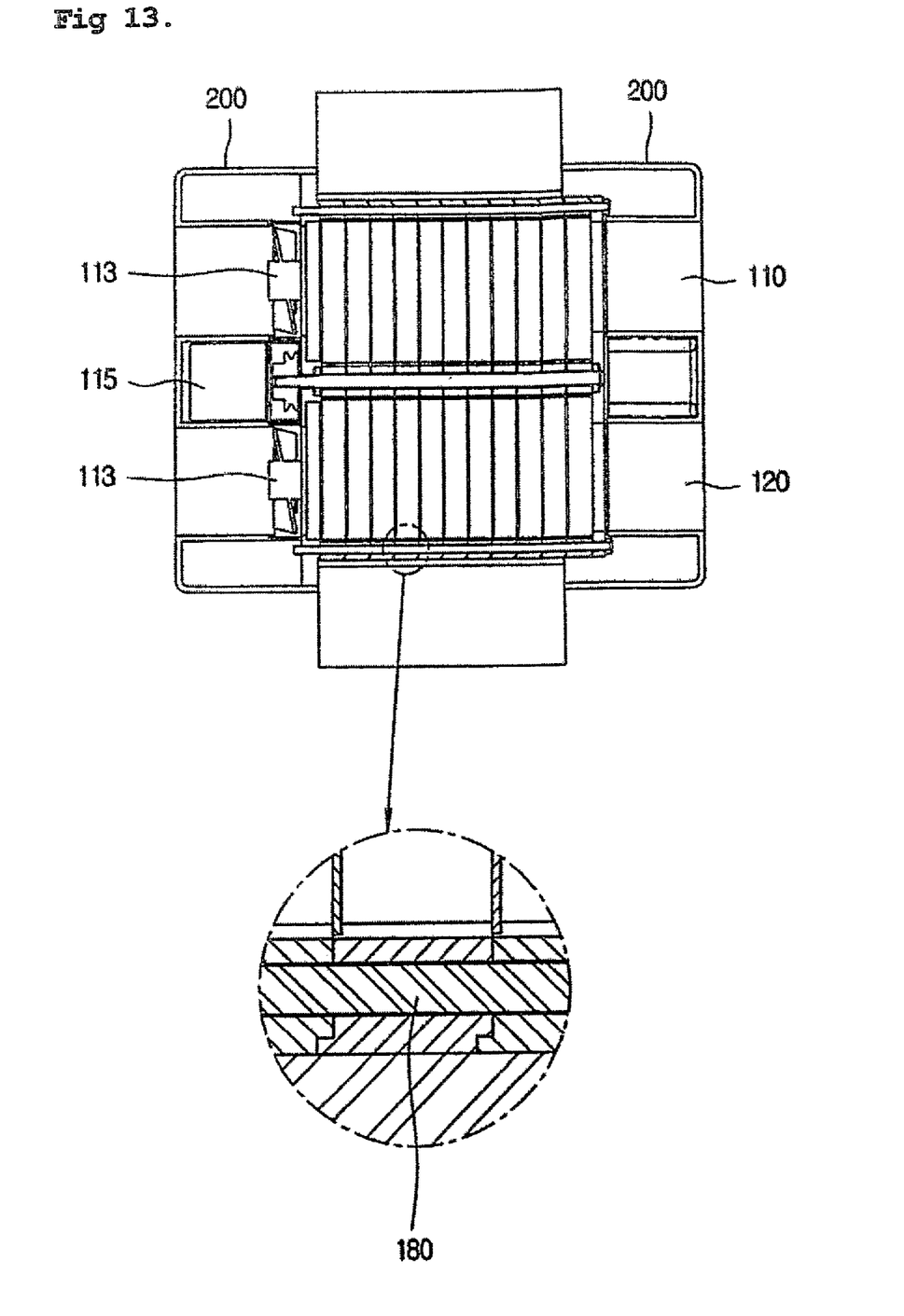
FIG. 13 is a view to show the apparatus of FIG. 7 in a sectional view and a partial enlarged view.

According to the first embodiment, the main body 10 is divided into upper and lower parts that are coupled to each other using the flanges. However, the main body 100 of the second embodiment is assembled through the coupling of separation units 150. As shown in FIGS. 11 and 12, each of the separation units 150 includes a ring frame 160 and a partition frame 170 which is integrally provided in a diameter direction of the ring frame 160. A plurality of bolt holes 185 is formed on a circumference of the ring frame 160 such that fastening bolts 180 pass through the corresponding bolt holes 185. Further, a shaft hole 195 is formed at a position on the partition frame 170 such that the main shaft 135 passes through the shaft hole 195.

Figure 14:
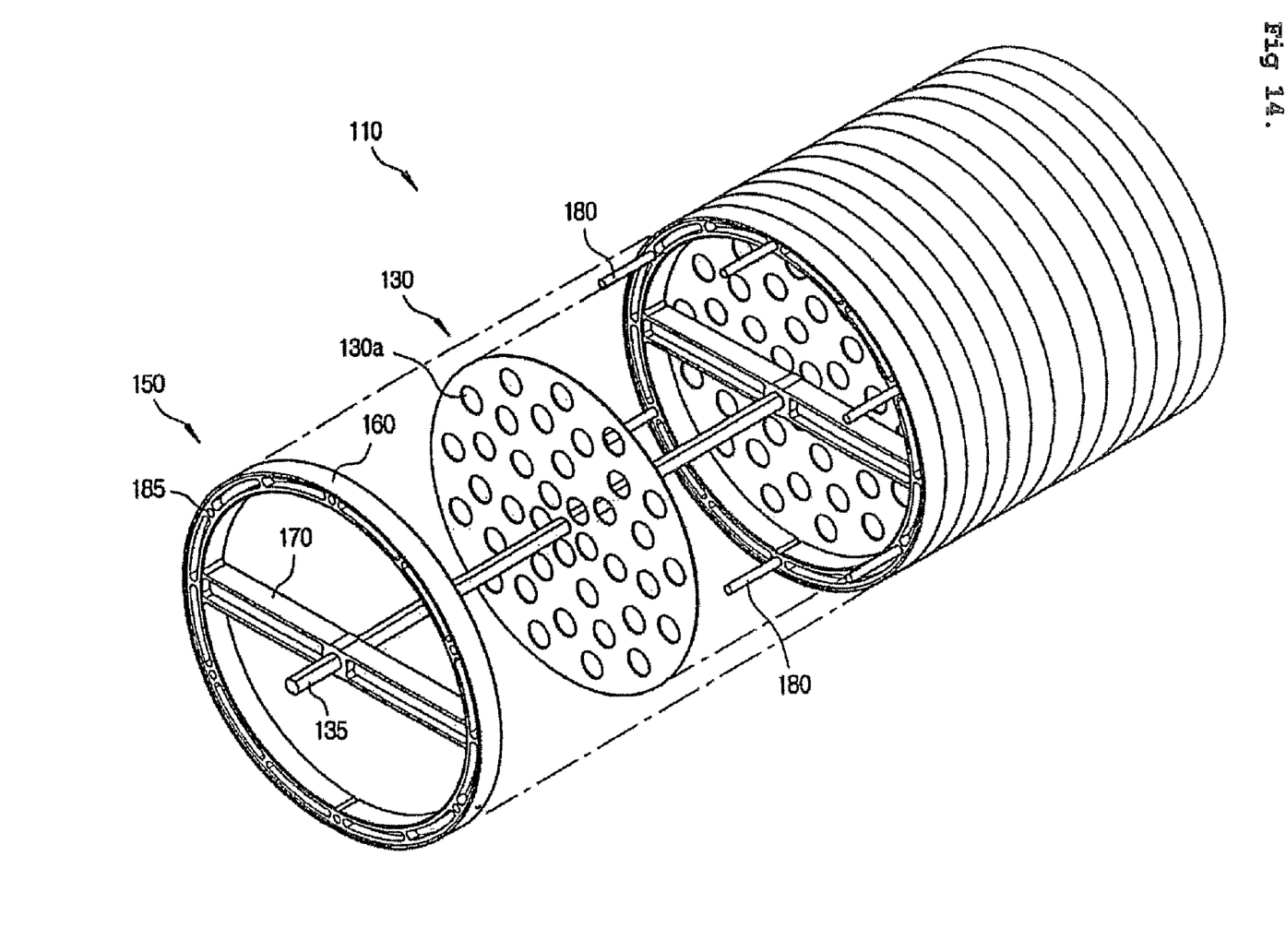
FIG. 14 is an exploded perspective view of a main body of the apparatus of FIG. 7.

Further, the electric heating plates 130 disclosed in the first embodiment are inserted between the separation units 150. That is, as shown in FIG. 14, the main body 100 is configured by sequentially coupling the separation units 150 to the electric heating plates 130 using the fastening bolts 180. The ring frames 160 are stacked up, thus providing the cylindrical main body 100. The partition frames 170 are coupled to each other, thus dividing the internal space of the main body 100 into two parts.

Since the outer diameter of each electric heating plate 130 is smaller than the inner diameter of the ring frame 160, the ring frames 160 do not hinder the rotation of the electric heating plates 130.

Further, as shown in the enlarged view of FIG. 12, a protruding step 151 is provided on one surface of each separation unit 150 at an end of each ring frame 160. A recessed step 152 corresponding to the protruding step 151 is provided on the other surface of each separation unit 150. As such, the protruding steps 151 and the recessed steps 152 provided on the ring frames 160 allow the separation units 150 to be in close contact with each other.

Figure 10:
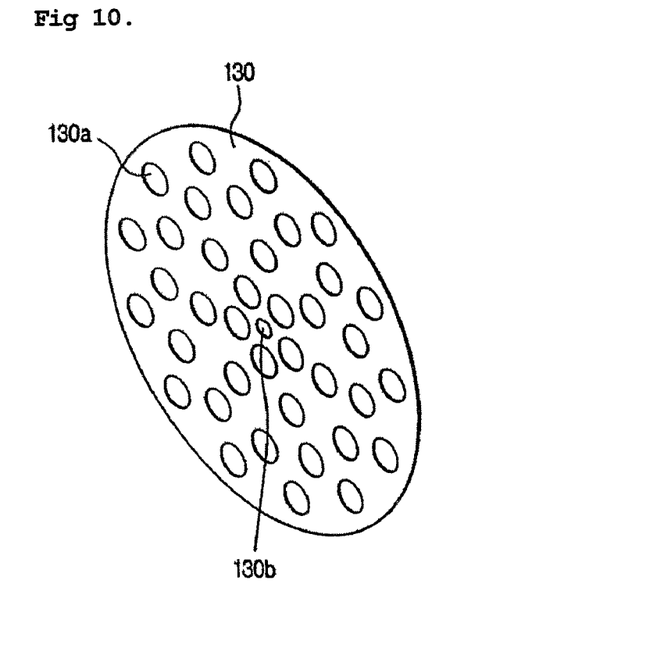
FIG. 10 is a perspective view of an electric heating plate of the apparatus of FIG. 7.

A shaft hole 130b is formed at the center of each electric heating plate 130, so that the electric heating plate 130 rotates by the rotation of the main shaft 135. Further, as shown in FIG. 10, a plurality of pores 130a is formed on each electric heating plate 130.

The invention claimed is:

1. A rotary-type heat recovery ventilation apparatus, constructed to perform heat exchange between inlet air and exhaust air, the apparatus comprising:
   a main body having an intake duct and a discharge duct therein;
   a plurality of electric heating plates passing through a space in the intake duct and the discharge duct of the main body to transfer heat, and rotating about a main shaft, with a plurality of pores being formed on each of the electric heating plates;
   a pair of blowing fans mounted to a surface of the intake duct and a surface of the discharge duct, thus blowing and exhausting air; and
   a motor to rotate the main shaft.

2. The ventilation apparatus according to claim 1, wherein the main body has a cylinder shape having a hollow part, the hollow part being divided into two parts by a flat partition plate, thus defining the intake duct and the discharge duct, and a plurality of slits is provided on the partition plate such that the electric heating plates are fitted into the slits.

3. The ventilation apparatus according to claim 2, wherein the main body is divided into upper and lower parts that are coupled to each other via a flange.

4. The ventilation apparatus according to claim 2, further comprising:

a sealing member provided in each of the slits, and preventing the flow of gas while each of the electric heating plates is inserted into the corresponding slit.

5. The ventilation apparatus according to claim 1, wherein the main body comprises:

a plurality of separation units coupled to each other, thus providing a cylindrical shape, each of the separation units comprising:

a ring frame having bolt holes at regular intervals such that fastening bolts are tightened into the corresponding bolt holes; and a partition frame integrally provided in a diameter direction of the ring frame, with a shaft hole formed in a central portion of the partition frame so that the main shaft passes through the shaft hole.

6. The ventilation apparatus according to claim 5, wherein the separation units are fastened to each other by tightening the fastening bolts into the corresponding bolt holes.

7. The ventilation apparatus according to claim 5, wherein the electric heating plates are seated between the separation units, and are rotated by the main shaft which is inserted into the shaft hole.

8. The ventilation apparatus according to claim 5, wherein a protruding step is provided on a surface of an end of the ring frame of each of the separation units, and a recessed step is provided on an opposite surface of the end of the ring frame, so that the separation units are closely coupled to each other by the protruding steps and the recessed steps.

* * * * *